April 8, 1941.  C. L. DOUGHTY ET AL  2,237,620
LIFTING MECHANISM
Filed May 20, 1939  3 Sheets-Sheet 3
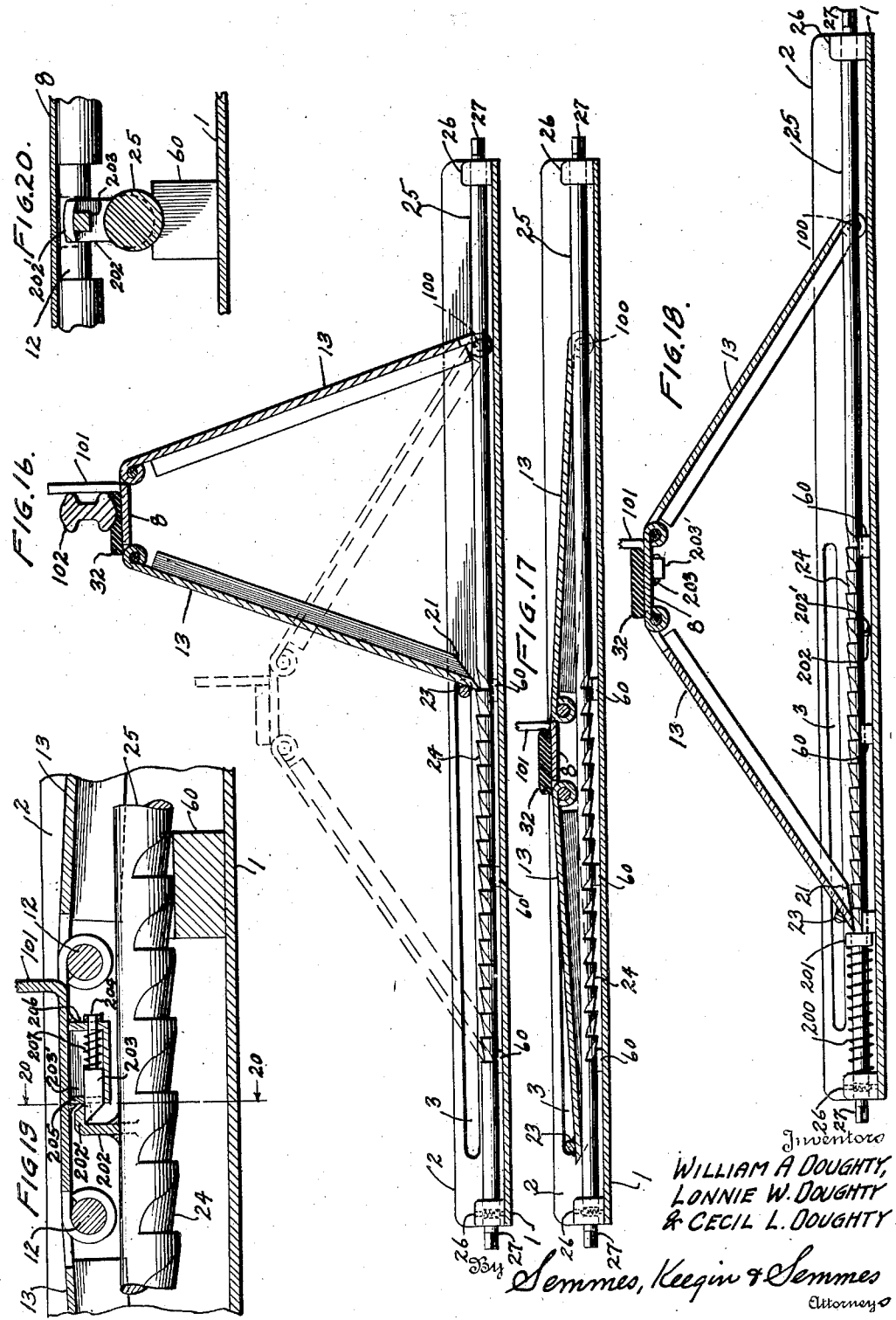
Inventors
WILLIAM A DOUGHTY,
LONNIE W. DOUGHTY
& CECIL L. DOUGHTY
By Semmes, Keegin & Semmes
Attorneys Patented Apr. 8, 1941

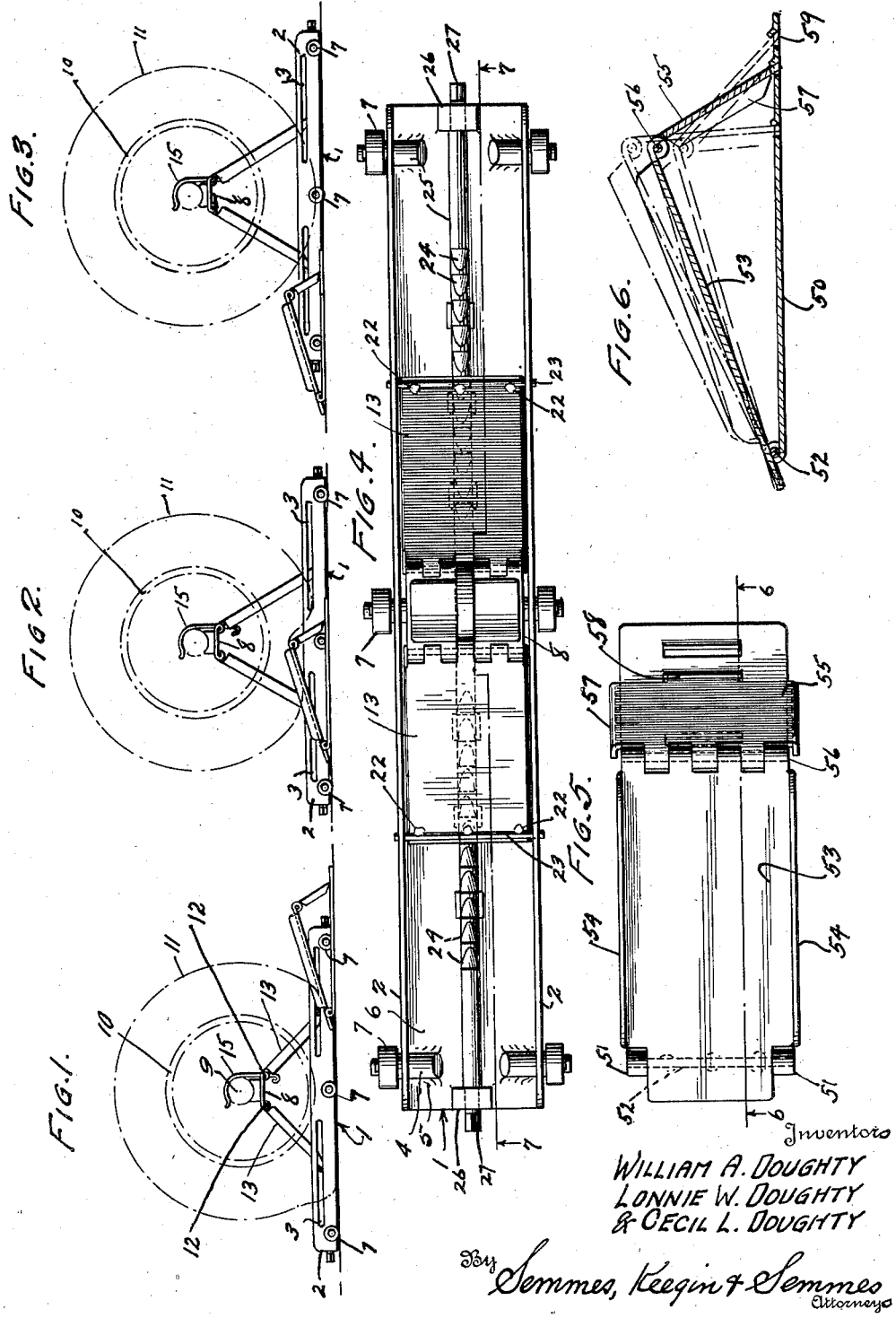

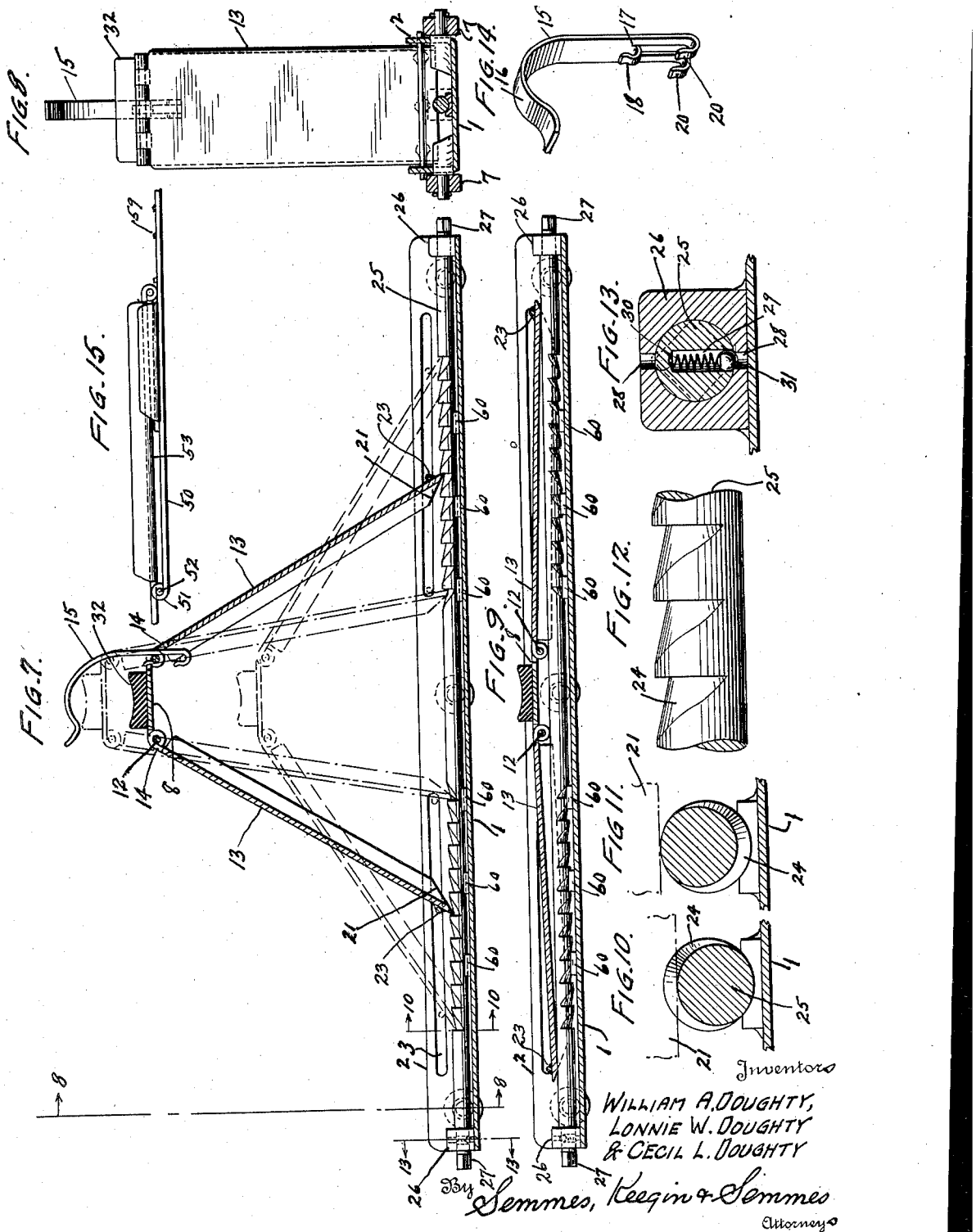

2,237,620

UNITED STATES PATENT OFFICE 2,237,620

LIFTING MECHANISM

Cecil L. Doughty, William A. Doughty, and Lonnie W. Doughty, Norfolk, Va.

Application May 20, 1939, Serial No. 274,818

20 Claims. (Cl. 254—1)

Our invention relates to a wheel lift for vehicles.

An object of our invention is to provide a simple collapsible construction which can be readily stored in a small space, yet which will efficiently and positively raise the wheel of a vehicle so that necessary work may be done upon it.

A further object of the invention is to provide such a construction as above described, which is simple to construct, light in weight, sturdy, and easy to repair and replace.

Further objects will ensue from the accompanying description.

In general our construction consists of a collapsible ramp which may be adjusted for varying heights, in combination with a holding member for supporting a wheel of a vehicle in the raised position. The holding member is collapsible and comprises a base and a toggle construction which is adapted to fit under the axle, the base and the toggle legs moving together with the forward or backward movement of the vehicle on the ramp.

In the drawings:

Figure 1 is a view in side elevation of our ramp and holding member construction, with a collapsed tire shown in dotted outlines;

Fig. 2 shows the same parts when the holding member has been carried forward by the forward movement of the vehicle and the wheel is in the raised position;

Fig. 3 is a view similar to Figs. 1 and 2, showing the position of the parts after the wheel is driven off the ramp and is completely supported by the holding member;

Fig. 4 is a top plan view of our holding member;

Fig. 5 is a top plan view of the ramp construction;

Fig. 6 is a view taken along the line 6—6 of Figure 5, looking in the direction of the arrows, the varying adjustable positions of the ramp being indicated by dotted lines;

Fig. 7 is a view taken along the line 7—7 of Figure 4, looking in the direction of the arrows;

Fig. 8 is a view taken along the line 8—8 of Figure 7, looking in the direction of the arrows;

Fig. 9 is a view similar to Figure 7, showing the toggle legs in collapsed position and the axle hook removed;

Fig. 10 is a detail sectional view taken through the rotatable rack taken along the line 10—10 of Figure 7, looking in the direction of the arrows;

Fig. 11 is a view similar to Figure 10, showing the rotatable rack in a position in which the toggle leg is no longer held by the notch on the rack;

Fig. 12 is a detail view in side elevation of a portion of our rotatable rack, showing the notched construction;

Fig. 13 is a view of a spring loaded ball detent construction for the rotatable rack, such view being taken along the line 13—13 of Figure 7, looking in the direction of the arrows;

Fig. 14 is a perspective view of the axle hook;

Fig. 15 is a view in side elevation of the ramp in its folded position.

Fig. 16 is a sectional view showing an alternative form of the holding member in raised positions.

Fig. 17 is a view similar to Figure 16 showing the holding member in collapsed condition.

Fig. 18 is a view partly in section of an alternate form of holding member.

Fig. 19 is a detail view partly in section showing the large mechanism for holding the holding member illustrated in Figure 18 in its collapsed condition.

Fig. 20 is a view taken along the line 19—19 of Figure 19 looking in the direction of the arrows.

Referring to the drawings, we have shown a holding member comprising a channel base 1 having upwardly extended side walls 2 which are provided with slots 3. Passing through the side walls 2 are stub axles 4, which are welded, as indicated at 5, to a bottom 6 of the base 1. Each of these stub axles carry rollers 7 to permit the base to move readily with the movement of the vehicle.

There is an axle support 8 which is adapted to lie under the axle 9 of a wheel 10 which is to be raised. The wheel 10 is shown with a tire 11 which is, as indicated in Figure 1, in a deflated condition. The axle support 8 has hinged thereto by a pin 12, channel-shaped toggle legs 13. The upper ends of the legs 13 are cut away as indicated at 14 exposing a portion of the hinge pin 12 so that an axle hook 15 (see Figure 14 for details of the hook) can be fitted around the pin 12. The axle hook 15 is provided with a hook member 16 at its upper end that is adapted to fit over the axle of the wheel. Moreover there is provided at 17 a hook 18 which may fit over one of the pins 12 upon which the toggle legs are pivoted to the axle support member 8. To provide for different size vehicles having axles of varying thickness, the axle hook 15 is provided with upturned hook members 20 which may alternately be hooked over the pivot members 12 to provide for a larger axle construction than is the case where the hook member 18 is hooked over the pins 12.

It is to be understood, of course, that the axle hook 15 may be adjusted on either side of the axle support 8 so that the vehicle can be driven either forward or backward as desired, and the axle hook 15 will carry the holding member with it. This feature, that the holding member can be moved in either direction and carried with the vehicle, is important, as often a tire must be changed in such a position that the vehicle can only be conveniently moved in one direction, such for instance as where the vehicle is adjacent a wall of a garage.

The toggle legs 13 have their lower ends beveled, as indicated at 21, and welded to the toggle legs, as indicated at 22, are members 23 which have projecting ends, and fit within the slots 3 formed within the upwardly extending walls 2 of the channel base construction. These beveled ends 21 of the toggle legs 13 are adapted to fit within notches 24 formed in a rotatable rack 25 that is journaled in supports 26 located at either end of the base 1. The notches 24 in the rotatable rack are shown as rounded and extending over part of the periphery of the rotatable rack only. This construction can be easily understood from an inspection of Figures 10, 11 and 12. In Figure 10 one of the sharp ends 21 of the pivoted toggle legs 13 is shown held in one of the notches 24 formed on the rotatable rack 25. By rotating the rotatable rack 25 180°, it can be seen that the end 21 of the toggle leg 13 will not lie within the notch 24.

In order to rotate the rod which forms the rotatable rack 25, the rod is provided at each end with an operating head 27 which may be of any desired shape to be engaged by means of a monkey wrench or any other tool which will permit the rack 25 to be rotated. When the notches 24 are rotated in the down position, as shown in Figure 11, the whole holding member construction can be collapsed, as shown in Figure 9, wherein the toggle legs are shown in their fully extended position.

There is indicated in the drawings a spring loaded ball detent construction at one end of the rotatable rack 25 which is adapted to hold the rotatable rack either in its operative position, as indicated in Figure 10, or its inoperative position, as indicated in Figure 11. The support 26, as shown in Figure 13, is provided with channels 28, and the rotatable rack 25 is provided with an aperture 29 in which is housed a compression spring 30 which bears against a ball 31. The ball 31 is adapted to lie either in the upper or lower channels 28 and thus hold the rotatable rack in either its operative or inoperative position.

The axle support 8 is provided with a resilient pad 32 upon which the axle rests. The resilient pad 32, when full weight comes on the holding member, will be compressed, thus freeing the axle hook 15 from the axle so that it may be readily rotated on its hinge 12 to a non-holding position, and permit the collapse of the toggle legs 13 when the rack is rotated into its inoperative position. Thus the resilient pad 32 performs a useful function in providing a ready means of release of the holding member from the axle after it has performed its function of maintaining the wheel of the vehicle in its raised position.

The adjustable ramp construction comprises a base 50 which carries at one end supports 51 for a pivot 52 on which is pivoted a support member 53, on which the wheel is adapted to travel. The support member 53 is provided with side walls 54 to minimize the possibility of the wheel driving off the ramp, and also to strengthen the construction to prevent its bending under forces to which it is subjected in use. A compression leg 55 is pivoted at 56 to the support 53. The compression leg is likewise formed with flanges 57 which strengthen the construction. This compression leg is provided with a downwardly extending lip 58 at the end, which is adapted to fit within slots 59 upstruck from the material of the base. This construction permits the ramp to be adjusted to varying heights, as plainly indicated in Figure 6.

The rotatable rack is preferably braced at various points along its length to prevent undue binding strains and injury to the rack. These supports are indicated at 60, see Figures 7 and 9.

It is to be noted that the toggle leg construction distributes the weight of the vehicle at remote points on the rack so that all of the weight of the vehicle is not concentrated at one point on the rack.

In operation the parts are positioned as indicated in Figure 1. The vehicle is driven forward until the wheel has passed to its highest point of elevation on the rack, as shown in Figure 2. The vehicle is further moved until the position shown in Figure 3 has been reached. It will be noted that during the movement of the vehicle the axle hook 15 carries forward the entire holding member construction and that during this movement the toggle legs become extended by reason of the weight of the base of the holding member. Various positions for the toggle legs are indicated in Figure 7, though it is to be noted that provision is made for a maximum elevation of the toggle legs when the rods 23 strike the inner ends of the slots 3 formed in the upstanding walls 2 of the channel base 1.

The vehicle will be held with the wheel in the raised position, as indicated in Figure 3, until the work has been completed, such as changing a tire. A suitable instrument, such as a crank or monkey wrench, which will fit the operating heads 27 of the rotating rack 25, is then placed in position and the rack is rotated to release the ends 21 of the toggle legs 13. The axle hook 15 has been previously moved to release the axle; the toggle legs collapse and the holding member is in the compact collapsed condition indicated in Figure 9. The ramp can be collapsed, as indicated in Figure 15, and the whole vehicle lift in this collapsed condition can then be readily stored in a small space.

It is noteworthy that there are practically no destructive strains on the parts in the operation of the device because the raising is done without any strain on the holding member, the ramp itself receiving the only strain in carrying the weight. The holding member then merely holds the weight after the raising has been effected. The construction is such that the raising operation can be performed by either driving the vehicle forward or backward. The ramp can be readily adjusted for various size tires and different operating conditions. The toggle leg supports are always at an angle to the perpendicular, which causes them to be pushed into the notches to hold them firmly in place under the weight of the car, but also the weight on the rotatable rack is distributed at distant points. The rack is further secured from injury by having supports placed under it and between it and the base of the holding member to prevent bending of the rack. The whole device can be readily collapsed and stored in a small space.

In Figures 16 and 17 we have shown an alternate form of our holding member. Here one of the legs 13 is pivoted at 100 to a pivot which passes through the upstanding sides 2 of the channel base 1. The axle support 8 has the customary cushion member 32 thereon and formed on the support 8 is an upstanding member 101 which is adapted to engage the axle 102 to move the toggle legs into the extended upward position.

In the form of device shown in Figures 16 and 17, the notches 24 are only adapted to be engaged by the beveled end 21 of one of the toggle legs 13. The operator adjusts the toggle legs to a position such that the upstanding member 101 contacts with the axle 102 and on forward movement of the axle 102, the toggle legs are raised.

It is to be understood that in all forms of the device herein shown where the term "axle" is used that any part of the vehicle adjacent the wheel to be raised may be employed to raise the toggle legs to throw the holding member into operative position.

Yet another form of holding member is shown in Figures 18, 19 and 20. Here one of the toggle legs is pivoted at 100 in the side walls 2 of the channel base 1 as was the case in the form just described in connection with Figures 16 and 17. In the form shown in Figures 18 to 20, however, there is a spring action which tends to raise the toggle legs into a position where the upstanding member 101 may be readily thrown into engagement with the axle or other part of the vehicle. This spring action facilitates the use of the device in cramped quarters. Means which will be described later are provided for holding the toggle legs in their "down" position against the tension of the raising spring.

The rotatable rack 25 has encircling it at one end a helical spring 200 which is adapted to push at one end against one of the supports 26 and at the other end against a collar 201 which is adapted to reciprocate on the rotatable rack 25. The collar 201 bears against the beveled end 21 of one of the toggle legs 13. As shown in Figure 18, the extension of the spring 200 will raise the toggle legs to the position shown in that figure.

However, for storing the holding member, it should be capable of being collapsed with the toggle legs in the "down" position. We have provided latch means for this purpose which comprise a hook member 202 rotatable with the rotatable rack 25. The hook member has a lip 202' which is beveled and arcuate in section (see Fig. 20). This lip member is adapted to be rotated over a latch 203 carried in a casing 203' having a front wall 205 and a rear wall 206. The latch member 203 is formed with a shank 204 which is adapted to pass out through the rear wall 206 of the casing 203'. The latch member 203 is adapted to pass out of an aperture in the front wall 205 of the casing 203'.

A helical spring 207 is placed over the stem 204 formed on the latch 203 and is adapted to hold the latch 203 in the position shown in Figure 18. Latch 203 has a beveled outer end which cooperates with the beveled outer end of the lip 202' to enable the lip 202' to readily assume the position shown in Figure 19. Where the bevel on the lip 202' engages the bevel on the latch 203 the spring 207 will be compressed to allow the latch to slip under the lip 202'.

In operation the rotatable rack 25 is rotated to cause the lip 202' to move in the path of the latch 203 for the parts to assume the position shown in Figures 19 and 20 and the toggle legs are compressed against the tension of the spring 200. This holds the toggle legs in the "down" position so that the device may be readily stored.

Upon rotation of the rotatable rack 25 so that it occupies the position illustrated in Figure 18 the lip 202' will be moved out of engagement with the latch 203 and the spring 200 will push against the collar 201 and thence against one of the legs 13 to raise the legs into the position illustrated in Figure 18.

While we have shown and described the preferred embodiment of our invention, we wish it to be understood that we do not confine ourselves to the precise details of construction herein set forth by way of illustration, as it is apparent that many changes and variations may be made therein, by those skilled in the art, without departing from the spirit of the invention, or exceeding the scope of the appended claims.

We claim:

1. A holding member for supporting a wheel of a vehicle in a raised position, comprising a base, toggle legs, attaching means to attach the legs to the vehicle to which the legs are pivoted, said attaching means being located at a point on the vehicle adjacent the wheel to be raised, and means carried by the base to hold the toggle legs in a raised position to maintain the wheel in a raised position.

2. A holding member for supporting a wheel of a vehicle in a raised position, comprising a base, toggle legs, attaching means to attach the legs to the vehicle to which the legs are pivoted, said attaching means being located at a point on the vehicle adjacent the wheel to be raised, means carried by the base to hold the toggle legs in a raised position to maintain the wheel in a raised position, and means to limit the movement of the toggle legs in the raised position.

3. A holding member for supporting a wheel of a vehicle in a raised position comprising a base, toggle legs, attaching means to attach the legs to the vehicle to which the legs are pivoted, said attaching means being located at a point on the vehicle adjacent the wheel to be raised, and rack means carried by the base into which the lower end of the toggle legs fit to hold them in raised position.

4. A holding member for supporting a wheel of a vehicle in a raised position comprising a base, toggle legs, attaching means to attach the legs to the vehicle to which the legs are pivoted, said attaching means being located at a point on the vehicle adjacent the wheel to be raised, rack means carried by the base into which the lower end of the toggle legs fit to hold them in raised position, and means to release the lower end of the legs from the rack while the wheel is in raised position.

5. A holding member supporting a wheel of a vehicle in a raised position comprising a base, toggle legs, attaching means to attach the legs to the vehicle to which the legs are pivoted, said attaching means being located at a point on the vehicle adjacent the wheel to be raised, and a rotatable rack carried by the base having notches therein into which the lower ends of the toggle legs fit to hold them in the raised position.

6. A holding member supporting a wheel of a vehicle in a raised position comprising a base, toggle legs, attaching means to attach the legs to the vehicle to which the legs are pivoted, said attaching means being located at a point on the vehicle adjacent the wheel to be raised, a rotatable rack carried by the base having notches therein into which the lower ends of the toggle legs fit to hold them in the raised position, and means at either end of the rack permitting it to be rotated from either end of the base.

7. A holding member for supporting a wheel of a vehicle in a raised position comprising a base, toggle legs, attaching means to attach the legs to the vehicle to which the legs are pivoted, said attaching means being located at a point on the vehicle adjacent the wheel to be raised, a rotatable rack carried by the base and having round notches extending over part of the periphery of the rack only into which notches the lower end of the toggle legs are adapted to fit to hold them in a raised position, and means to rotate the rack to release the ends of the legs from the notches.

8. A holding member for supporting a wheel of a vehicle in a raised position comprising a base, toggle legs, attaching means to attach the legs to the vehicle to which the legs are pivoted, said attaching means being located at a point on the vehicle adjacent the wheel to be raised, a rotatable rack carried by the base and having round notches extending over part of the periphery of the rack only into which notches the lower end of the toggle legs are adapted to fit to hold them in a raised position, and means located at either end of the rack to rotate it to release the ends of the legs from the notches.

9. A holding member supporting a wheel of a vehicle in a raised position comprising a base, toggle legs, attaching means to attach the legs to the vehicle to which the legs are pivoted, said attaching means being located at a point on the vehicle adjacent the wheel to be raised, a rotatable rack carried by the base having notches therein into which the lower ends of the toggle legs fit to hold them in the raised position, and supports carried by the base against which the rack lies to relieve the bending strains on the rack.

10. A holding member for supporting a wheel of a vehicle in a raised position comprising a base, toggle legs, attaching means to attach the legs to the vehicle to which the legs are pivoted, said attaching means being located at a point on the vehicle adjacent the wheel to be raised, rotatable rack means carried by the base into which the lower ends of the toggle legs fit to hold them in their raised position, and means at either end of the rack permitting it to be rotated from either end of the base.

11. A device for supporting a wheel of a vehicle in a raised position comprising a base, toggle legs, one of which is pivoted to the base, a support movable by the vehicle to raise the toggle legs, and means carried by the base to hold the toggle legs in a raised position to maintain the wheel in a raised position.

12. A device for supporting a wheel of a vehicle in a raised position comprising a channel-shaped base, slots in the upwardly extending walls of the channel, toggle legs, one of which is pivoted to the base, a support movable by the vehicle to raise the legs, means carried by the channel-shaped base to hold the toggle legs in a raised position, and lugs carried by one of the legs fitting into the slots formed in the upwardly extending walls of the base to hold the legs to the base and to limit the upward movement of the legs in their raised position.

13. A jack-like device for supporting a wheel of a vehicle in a raised position comprising a base, toggle legs, one of which is pivoted to the base, a support to which the legs are pivoted adapted to fit under a part of the vehicle, means carried by the base to hold the toggle legs in a raised position, and spring means which when released tends to raise the toggle legs.

14. A jack-like device for supporting a wheel of a vehicle in a raised position comprising a base, toggle legs, one of which is pivoted to the base, a support to which the legs are pivoted adapted to fit under a part of the vehicle, means carried by the base to hold the toggle legs in a raised position, a spring to raise the toggle legs, and a release operated by the position of said means to compress the spring.

15. A jack-like device for supporting a wheel of a vehicle in raised position comprising a base, toggle legs, one of which is pivoted to the base, a support to which the legs are pivoted adapted to fit under a part of the vehicle, a rack carried by the base having notches therein into which the lower end of the toggle leg is adapted to fit to hold the toggle legs in a raised position, a spring to raise the toggle legs, and a release operated by the position of the said rack to compress the spring.

16. A jack-like device for supporting a wheel of a vehicle in a raised position comprising a base, toggle legs, one of which is pivoted to the base, a support to which the legs are pivoted adapted to fit under a part of the vehicle, a rotatable rack carried by the base having notches therein into which the lower end of the toggle leg fits to hold the legs in a raised position, means at either end of the rack permitting it to be rotated from either end of the base, a spring adapted to raise the toggle legs and a release operated by the position of the said rotatable rack to compress the spring.

17. A holding member for supporting a wheel of a vehicle in a raised position comprising a base, rollers carried by the base adapted to permit the base to move readily with the vehicle, toggle legs, attaching means to attach the legs to the vehicle to which the legs are pivoted, said attaching means being located at a point on the vehicle adjacent the wheel to be raised, and means carried by the base to hold the toggle legs in a raised position to maintain the wheel in a raised position.

18. A holding member for supporting a wheel of a vehicle in a raised position comprising a channel-shaped base, slots in the upwardly extending walls of the channel, toggle legs, attaching means to attach the toggle legs to a vehicle to which the legs are pivoted, said attaching means being located at a point on the vehicle adjacent the wheel to be raised, means carried by the channel-shaped base to hold the toggle legs in a raised position, and lugs carried by the legs fitting into the slots formed in the upwardly extending walls of the base to hold the legs to the base and to limit the upward movement of the legs in their raised position.

19. A holding member for supporting a wheel of a vehicle in a raised position comprising a base, toggle legs, a pivoted axle hook adapted to fit over an axle of the vehicle to be raised to cause the holding member to move with the movement of the vehicle, a support to which the legs are pivoted adapted to fit under the axle of the vehicle, and means carried by the base to hold the toggle legs in a raised position.

20. A holding member for supporting a wheel of a vehicle in a raised position comprising a base, toggle legs, a pivoted axle hook adapted to fit over an axle of the vehicle to be raised to cause the holding member to move with the movement of the vehicle, a support to which the legs are pivoted adapted to fit under the axle of the vehicle, means carried by the base to hold the toggle legs in a raised position, and resilient cushioning means carried by the support on which the axle is adapted to rest compressible under the weight of the vehicle, whereby the pivoted axle hook can be readily swung out of engagement with the axle.

CECIL L. DOUGHTY.
WILLIAM A. DOUGHTY.
LONNIE W. DOUGHTY.